United States Patent
Gao et al.

(10) Patent No.: US 9,204,419 B2
(45) Date of Patent: Dec. 1, 2015

(54) PROCESSING CROWDSOURCED DATA FOR NON-GEOTAGGED ACCESS POINTS

(71) Applicant: QUALCOMM Incorporated, San Diego, CA (US)

(72) Inventors: Weihua Gao, San Jose, CA (US); Anil R. Admal, San Jose, CA (US); Gengsheng Zhang, Cupertino, CA (US); David Richard Coleman, San Jose, CA (US); Ashok Bhatia, San Diego, CA (US); Arun Agrawal, Sunnyvale, CA (US); Srimaruti Manoj Nimmagadda, Santa Clara, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/248,200

(22) Filed: Apr. 8, 2014

(65) Prior Publication Data

US 2015/0289225 A1 Oct. 8, 2015

(51) Int. Cl.
*H04W 24/00* (2009.01)
*H04W 64/00* (2009.01)
*H04W 24/02* (2009.01)
*G01S 5/02* (2010.01)

(52) U.S. Cl.
CPC .......... *H04W 64/003* (2013.01); *G01S 5/0205* (2013.01); *H04W 24/02* (2013.01)

(58) Field of Classification Search
CPC ..... H04W 64/00; H04W 4/023; H04W 4/021; H04W 4/043; H04W 4/008; H04W 48/16; H04W 64/003; H04W 84/12; G01S 5/0242; G01S 5/0289; G01S 5/14

USPC .................................. 455/456.1–456.6, 434
See application file for complete search history.

(56) References Cited

U.S. PATENT DOCUMENTS

| | | | | |
|---|---|---|---|---|
| 7,242,947 | B2* | 7/2007 | Niu et al. | 455/456.1 |
| 7,623,866 | B1* | 11/2009 | Spitzer | 455/442 |
| 8,320,331 | B2* | 11/2012 | Vikberg et al. | 370/331 |
| 2007/0132639 | A1* | 6/2007 | Korneluk et al. | 342/464 |

(Continued)

FOREIGN PATENT DOCUMENTS

| | | |
|---|---|---|
| WO | 2009155036 A2 | 12/2009 |
| WO | 2013040711 A1 | 3/2013 |
| WO | 2013108243 A1 | 7/2013 |

OTHER PUBLICATIONS

International Search Report and Written Opinion—PCT/US2015/017993—ISA/EPO—Aug. 14, 2015, 10 pgs.

*Primary Examiner* — Magdi Elhag
(74) *Attorney, Agent, or Firm* — Hunter Clark PLLC

(57) ABSTRACT

Techniques for publishing location information associated with a non-geotagged transceiver are disclosed. A method for publishing a position of a non-geotagged transceiver in a wireless communication system includes determining a first position of the non-geotagged transceiver based on a periodic neighbor list, determining a second position of the non-geotagged transceiver based on an accumulated neighbor list, determining if the first position and the second position agree, publishing a third position if the first position and the second position agree, such that the third position is determined based on the union of the periodic neighbor list and the accumulated neighbor list, and resetting the accumulated neighbor list if the first and second position do not agree.

30 Claims, 13 Drawing Sheets

(56) References Cited

U.S. PATENT DOCUMENTS

| | | |
|---|---|---|
| 2007/0270157 A1* | 11/2007 | Kim et al. .................. 455/456.1 |
| 2009/0221287 A1* | 9/2009 | Balasubramanian et al. 455/434 |
| 2011/0286437 A1 | 11/2011 | Austin et al. |
| 2012/0133555 A1 | 5/2012 | Hyun |
| 2012/0188938 A1 | 7/2012 | Venkatraman et al. |
| 2014/0036768 A1 | 2/2014 | Gao et al. |
| 2014/0087763 A1* | 3/2014 | Gao et al. ................... 455/456.3 |
| 2014/0253385 A1* | 9/2014 | Amizur et al. ................ 342/387 |

* cited by examiner

PROCESSING CROWDSOURCED DATA FOR NON-GEOTAGGED ACCESS POINTS

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and utilized to locate the position of a wireless communication device. In an example, the location of a wireless communication device may be derived from signals received from a network including wireless Access Points (APs). Position information associated with each of the APs in a wireless network can be stored in a central database. In some networks, the AP position information can be updated based on periodic surveys (e.g., drive-by surveys). The position of the wireless communication device within the network can be calculated based on AP position information along with parameters such as received signal strength indicators (RSSI), times of arrival (TOA), or time differences of arrival (TDOA), among others.

SUMMARY

An example method for publishing a position of a non-geotagged transceiver in a wireless communication system according to the disclosure includes determining a first position of the non-geotagged transceiver based on a periodic neighbor list, determining a second position of the non-geotagged transceiver based on an accumulated neighbor list, determining if the first position and the second position agree, publishing a third position if the first position and the second position agree, such that the third position is determined based on a union of the periodic neighbor list and the accumulated neighbor list, and resetting the accumulated neighbor list if the first position and the second position do not agree.

Implementations of such a method may include one or more of the following features. The first position and the second position may be determined on a regular time period. The regular time period may be once a day. The third position may be published if the first position and the second position agree for a consecutive number of time periods defined by an observation window. The observation window may be three time periods. The periodic neighbor list may be added to the accumulated neighbor list if the first position and the second position agree. The first position and the second position may agree if a distance between the first position and the second position is less than a predetermined threshold. Previously published position information for the non-geotagged transceiver may be depublished if the first position and the second position do not agree.

An example of an apparatus for publishing a position of a non-geotagged transceiver in a wireless communication system according to the disclosure includes a memory, at least one processor operationally coupled to the memory and configured to determine a first position of the non-geotagged transceiver based on a periodic neighbor list, determine a second position of the non-geotagged transceiver based on an accumulated neighbor list, determine if the first position and the second position agree, publish a third position if the first position and the second position agree, such that the third position is determined based on a union of the periodic neighbor list and the accumulated neighbor list, and reset the accumulated neighbor list if the first position and the second position do not agree.

Implementations of such an apparatus may include one or more of the following features. The processor may be configured to determine the first position and the second position at a regular time period (e.g., once a day). The processor may be configured to publish the third position if the first position and the second position agree for a consecutive number of time periods defined by an observation window. The observation window may three time periods. The processor may be further configured to add the periodic neighbor list to the accumulated neighbor list if the first position and the second position agree. The processor may be configured to determine that the first position and the second position agree if a distance between the first position and the second position is less than a predetermined threshold. The processor may be further configured to depublish a previously published position information for the non-geotagged transceiver if the first position and the second position do not agree.

An example non-transitory processor-readable storage medium includes processor-readable instructions for publishing a position of a non-geotagged transceiver in a wireless communication system according to the disclosure includes code for determining a first position of the non-geotagged transceiver based on a periodic neighbor list, determining a second position of the non-geotagged transceiver based on an accumulated neighbor list, determining if the first position and the second position agree, publishing a third position if the first position and the second position agree, such that the third position is determined based on a union of the periodic neighbor list and the accumulated neighbor list, and resetting the accumulated neighbor list if the first position and the second position do not agree.

Items and/or techniques described herein may provide one or more of the following capabilities, as well as other capabilities not mentioned. Techniques described herein increase the robustness for positioning of non-geotagged access points and other transceivers based on user-submitted data, improving position performance for indoor environments and other areas. Position information for non-geotagged access points and transceivers can be published to location based service application when convergence over an observation window is satisfied. Previously published position information for non-geotagged access points can be depublished if convergence requirements are not satisfied. Non-geotagged transceiver positions are determined via a crowdsourcing process, a database or other records corresponding to the non-geotagged transceiver positions can be built without a centralized source of this information. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect

DETAILED DESCRIPTION

Systems and methods are provided for evaluating and utilizing non-geotagged transceiver listings, such as Wi-Fi access point (AP) scan lists, to estimate and publish non-geotagged transceiver positions. Systems and methods are provided for positioning of non-geotagged APs in a wireless communication system, e.g., a Wi-Fi system, a cellular system including femtocells or other movable access points, a network of devices communicating via BLUETOOTH® short-range wireless communication technology and/or other wireless technologies, etc. The systems and methods for estimating transceiver positions are also provided, such as those described in U.S. patent application Ser. No. 13/782,907 titled "Non-Geotagged Access Point Positioning," filed on Mar. 1, 2013, which is incorporated herein by reference in its entirety.

Figure 1:
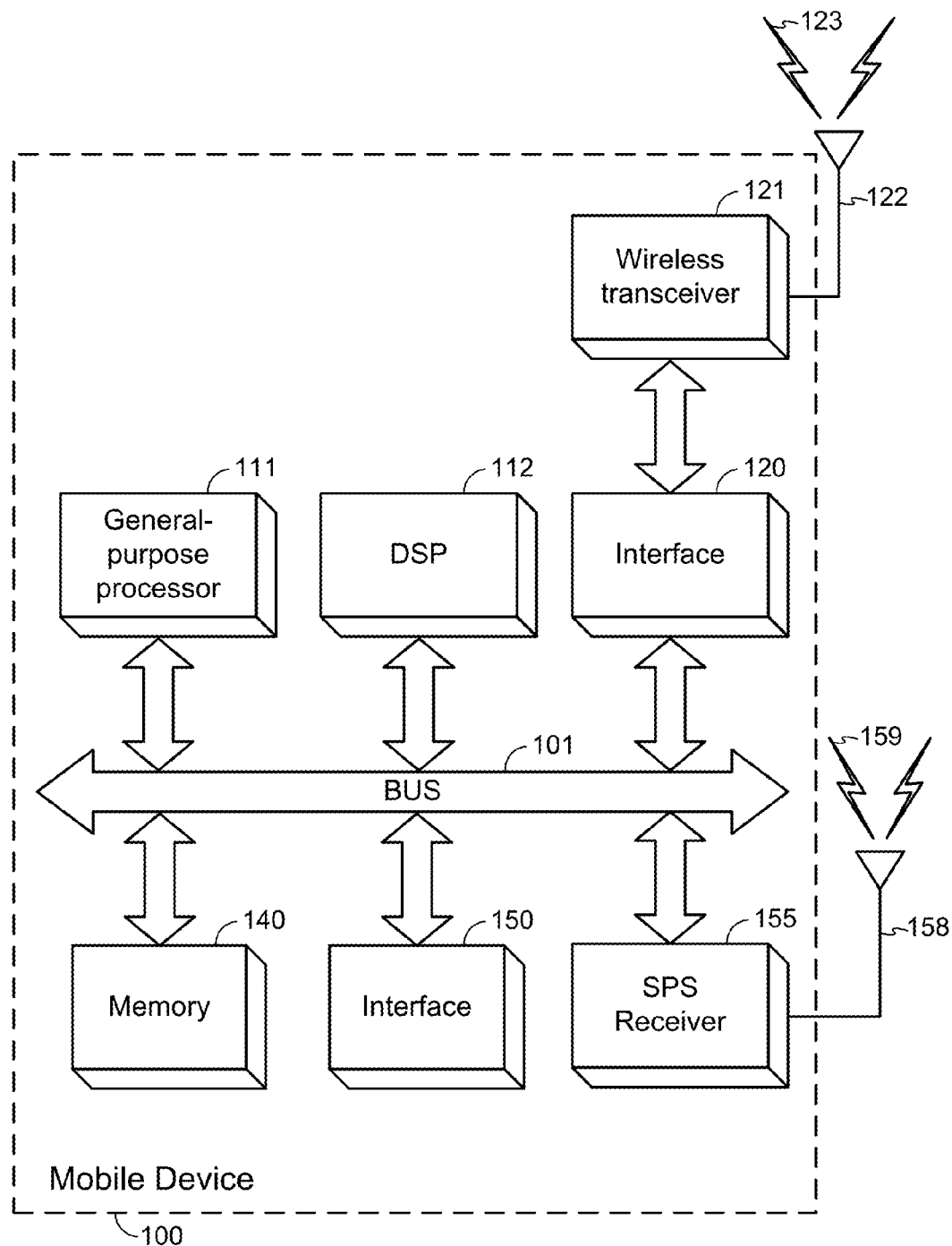
FIG. 1 is a block diagram of components of one embodiment of a mobile station.

Referring to FIG. 1, a mobile device 100 is illustrated for which various techniques herein can be utilized. The mobile device 100 can include or implement the functionality of various mobile communication and/or computing devices; examples include, but are not limited to, personal digital assistants (PDAs), smartphones, computing devices such as laptops, desktops or tablet computers, automobile computing systems, etc., whether presently existing or developed in the future.

The mobile device 100 includes an interface 120 and a wireless transceiver 121 configured to send and receive wireless signals 123 via a wireless antenna 122 over a wireless network. The wireless transceiver 121 is connected to a bus 101. Here, the mobile device 100 is illustrated as having a single wireless transceiver 121. However, a mobile device 100 can alternatively have multiple wireless transceivers 121 and wireless antennas 122 to support multiple communication standards such as Wi-Fi, CDMA, Wideband CDMA (WCDMA), Long Term Evolution (LTE), BLUETOOTH short-range wireless communication technology, etc.

The interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The mobile device 100 also includes a user interface 150 (e.g., display, GUI), and an SPS receiver 155 that receives satellite positioning system (SPS) signals 159 (e.g., from SPS satellites) via an SPS antenna 158. The SPS receiver 155 can communicate with a single global navigation satellite system (GNSS) or multiple such systems. A GNSS can include, but are not limited to, Global Positioning System (GPS), Galileo, Glonass, Beidou (Compass), etc. SPS satellites are also referred to as satellites, space vehicles (SVs), etc. The SPS receiver 155 processes, in whole or in part, the SPS signals 159 and uses these SPS signals 159 to determine the location of the mobile device 100. At least one general-purpose processor 111, memory 140, DSP 112 and/or specialized processor(s) (not shown) may also be utilized to process the SPS signals 159, in whole or in part, and/or to calculate the location of the mobile device 100, in conjunction with SPS receiver 155. Storage of information from the SPS signals 159 or other location signals is performed using a memory 140 or registers (not shown). While only one general-purpose processor 111, one DSP 112 and one memory 140 are shown in FIG. 1, more than one of any, a pair, or all of these components could be used by the mobile device 100. The at least one general-purpose processor 111 and DSP 112 associated with the mobile device 100 are connected to the bus 101.

The memory 140 can include a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the mobile device 100 may be performed in whole or in part in hardware.

A mobile device 100 can estimate its current position within an associated system using various techniques, based on other communication entities within view and/or information available to the mobile device 100. For instance, a mobile device 100 can estimate its position using information obtained from access points (APs) associated with one or more wireless local area networks (LANs), personal area networks (PANs) utilizing a short-range wireless communication technology such as BLUETOOTH or ZIGBEE®, etc., SPS satellites, and/or map constraint data obtained from a map server or LCI server, as well as additional information as described in further detail below.

Figure 2:
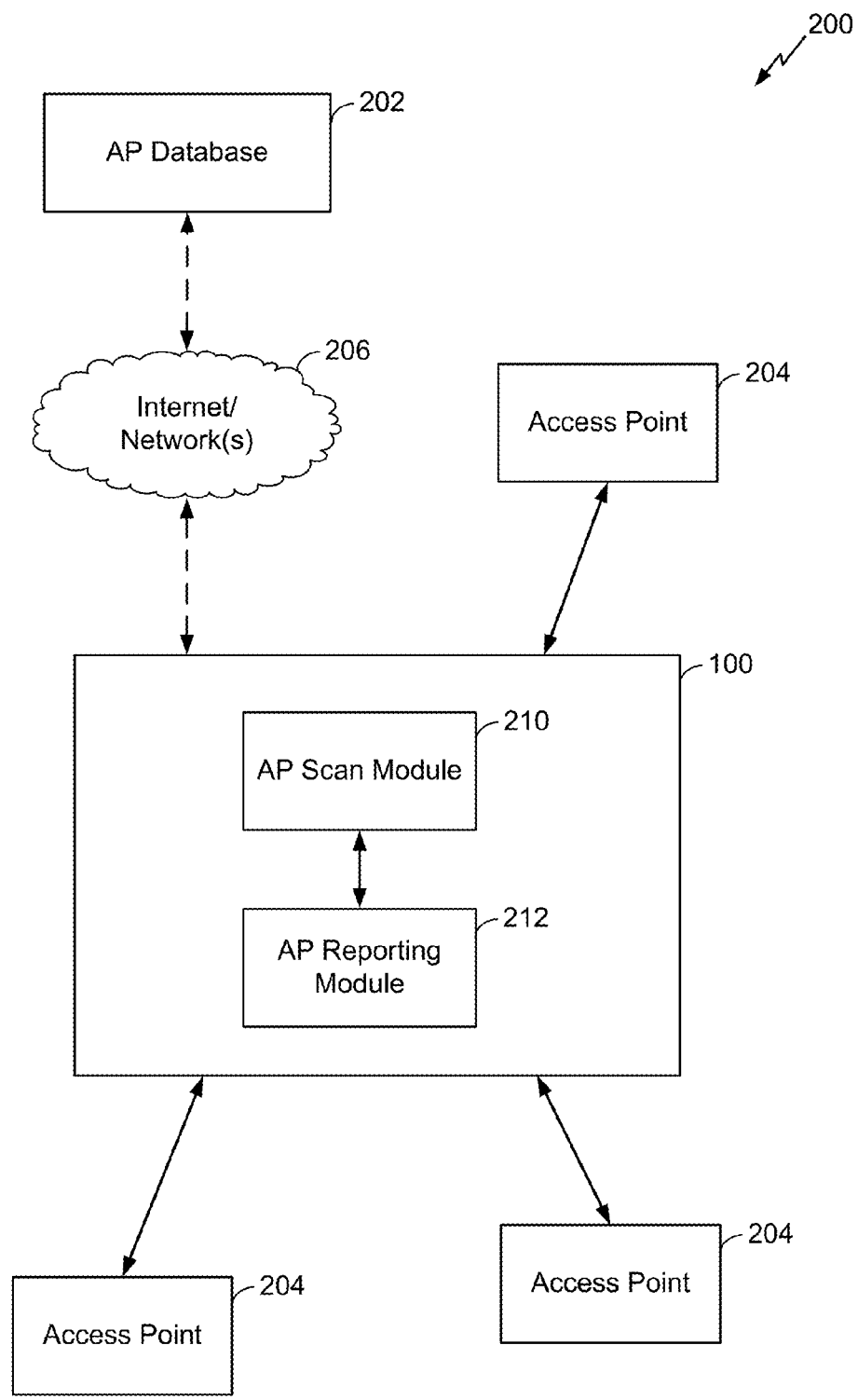
FIG. 2 is a block diagram of a system for compiling AP scan list information.

Referring next to FIG. 2, a system 200 for compiling AP scan list information includes the mobile device 100 illustrated by FIG. 1 in addition to an AP database 202 and APs 204. The APs 204 are wireless transceivers and are positioned within an area associated with the mobile device. The APs 204 may provide communication service for a surrounding area. The APs 204 may also selectively provide communication service for one or more devices in the surrounding area, which may or may not include the mobile device 100, based on access restrictions, loading restrictions or other factors. Additionally, while not illustrated in FIG. 2 the system may also include location beacons and/or other devices which broadcast location-related information but do not provide communication service. Further, while FIG. 2 and the description herein refer specifically to a Wi-Fi communication network or other communication system having APs 204, other transceivers, such as BLUETOOTH short-range wireless communication technology transceivers, femtocells, or the like, could be used in addition to, or in place of, the APs 204 without departing from the scope of the description.

An AP scan module 210, which may be a wireless transceiver 121 of the mobile device 100 or a specialized unit, performs a scan of APs 204 within range of the mobile device 100. In response to this scan, the AP scan module 210 receives information from the APs 204 and/or other devices. Subsequently, an AP reporting module 212 is utilized to provide the received information from the APs to one or more data sources. As illustrated in FIG. 2, the AP reporting module 212 may transmit AP information over the Internet or one or more networks 206 to a network-based AP database 202. While the AP database 202 is illustrated as a network entity remote from the mobile device 100, the AP database 202 and/or some or all of its functionality could alternatively be implemented at the mobile device 100, e.g., via a memory 140.

The AP database 202 compiles AP information from one or more mobile devices in the form of network scan lists (e.g., Wi-Fi scan lists, BLUETOOTH short-range wireless communication technology scan lists, cellular scan lists, etc.) or other suitable formats. For instance, the AP database 202 may maintain a crowdsourced set of AP scan lists, as described in further detail below. Other implementations of the AP database 202 are also possible.

When a mobile device 100 is engaged in crowdsourcing, the mobile device 100 may additionally have access to an external positioning system, such as a GNSS (via a SPS receiver 155 as described above) or the like. However, in some cases an external positioning service may not be available. For example, when the mobile device is in a deep indoor environment or urban canyon, a GNSS service may not be available. In this case, a generated scan list will not have any direct position information. As another example, the mobile device may not have GNSS capability or may be configured to allow simultaneous GNSS and wireless communication. In this case, the scan list may be organized in the format shown in Table 1 below, where P indicates a present feature, N/A indicates a non-present feature, and O indicates an optional feature. Table 1 provides an example scan list format for a Wi-Fi scan list; other network scan lists associated with other network technologies, such as BLUETOOTH short-range wireless communication technology scan lists or cellular scan lists, may utilize similar structures.

TABLE 1

Format of Wi-Fi scan list without GNSS information

Observation specific data

| | | |
|---|---|---|
| Observation time | P | Standard 64 bit UTC ms timestamp, or GPS time stamp |
| Latitude | N/A | |
| Longitude | N/A | |
| Altitude | N/A | |
| Horizontal Uncertainty | N/A | |
| Vertical Uncertainty | N/A | |
| Per AP data (includes all AP scanned, repeated for each AP) | | |
| MAC Address | P | MAC address of AP |
| SSID | O | SSID of AP |
| Encryption Type | O | Encryption type, open, WEP, WPA, WPA-PSK, or EAP |
| RSSI | P | Observed RSSI in dBm |

TABLE 1-continued

Format of Wi-Fi scan list without GNSS information

| | | |
|---|---|---|
| RTT | O | Observed RTT in units of nanoseconds |
| Radio Spec | O | IEEE 802.11a. IEEE 802.11b, IEEE, 802.11g, IEEE, 802.11n, . . . |
| Frequency Band | O | Frequency band, 2.4 gHz or 5 gHz |
| Channel Number | O | Channel used by the network |
| Maximum Rate | O | Maximum data rate supported by the AP in Mbps |
| Network Type | O | Network type: AdHoc or Infrastructure |

Figure 3:
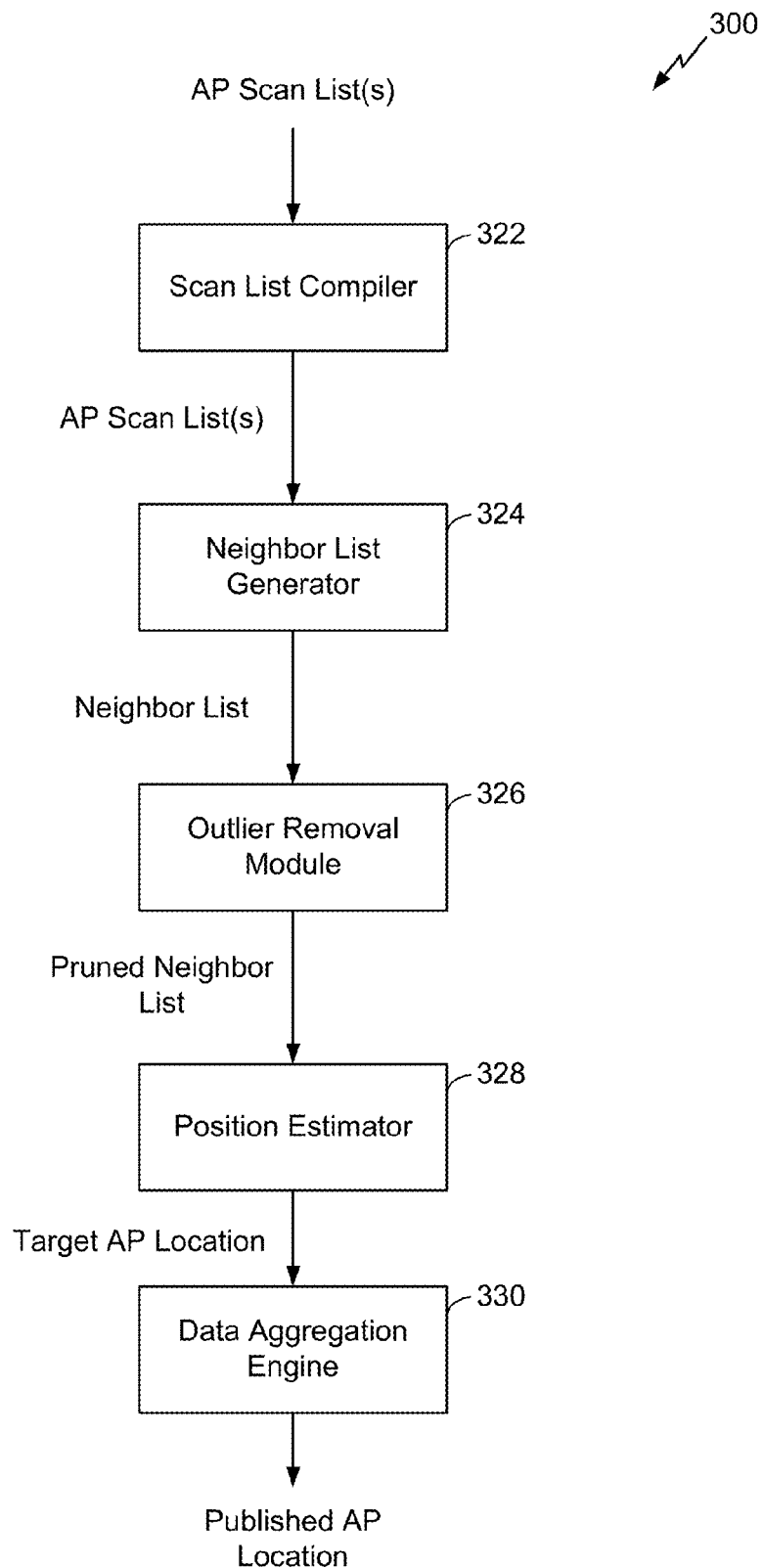
FIG. 3 is a block diagram of a system for estimating location of a target AP using AP scan list information.

While there is no explicit position information in the scan list as constructed according to Table 1, implicit position information may be embedded in the list. For instance, positions of one or more APs 204 associated with the scan list may be stored at and retrieved from the AP database 202. From these locations, the positions for APs 204 which are not in the AP database 202 may also be calculated. A block diagram of a system for these calculations is shown by system 300 in FIG. 3, which includes a scan list compiler 322, a neighbor list generator 324, an outlier removal module 326, a position estimator 328, and a Data Aggregation Engine 330 that are communicatively coupled to each other (e.g., directly or indirectly). System 300 may be implemented wholly or in part at the mobile device 100, at a server (e.g., a server associated with the AP database 202) or other computing entity remote to the mobile device 100, or a combination of the mobile device 100 and a remote computing entity. With respect to positioning of a target AP, one or more AP scan lists are obtained via the scan list compiler 322 (e.g., the scan list compiler sends the one or more AP scan lists to a transceiver database, e.g., the AP database 202). The scan list compiler 322 can obtain the one or more AP scan lists, e.g., from one or more mobile devices 100 via a crowdsourcing process, and/or by other means. The one or more AP scan lists are processed via the neighbor list generator 324 as described below, resulting in a list of neighbor APs, i.e., APs that are within communication range of the target AP, and preferably capable of communication with the target AP (e.g., are not prevented from communicating with the target AP). The terms "list of neighbor APs" and "list of neighbor transceivers" are used interchangeably herein with the terms "neighbor list of APs" and "neighbor list of transceivers," respectively. The outlier removal module 326 may further process this list to prune any erroneously listed APs according to one or more techniques as described below. From the processed list, a position estimator 328 determines the location of the target AP. The data aggregation engine 330 may periodically process a list of AP locations to publish AP location information according to one or more techniques as described below.

Figure 4:
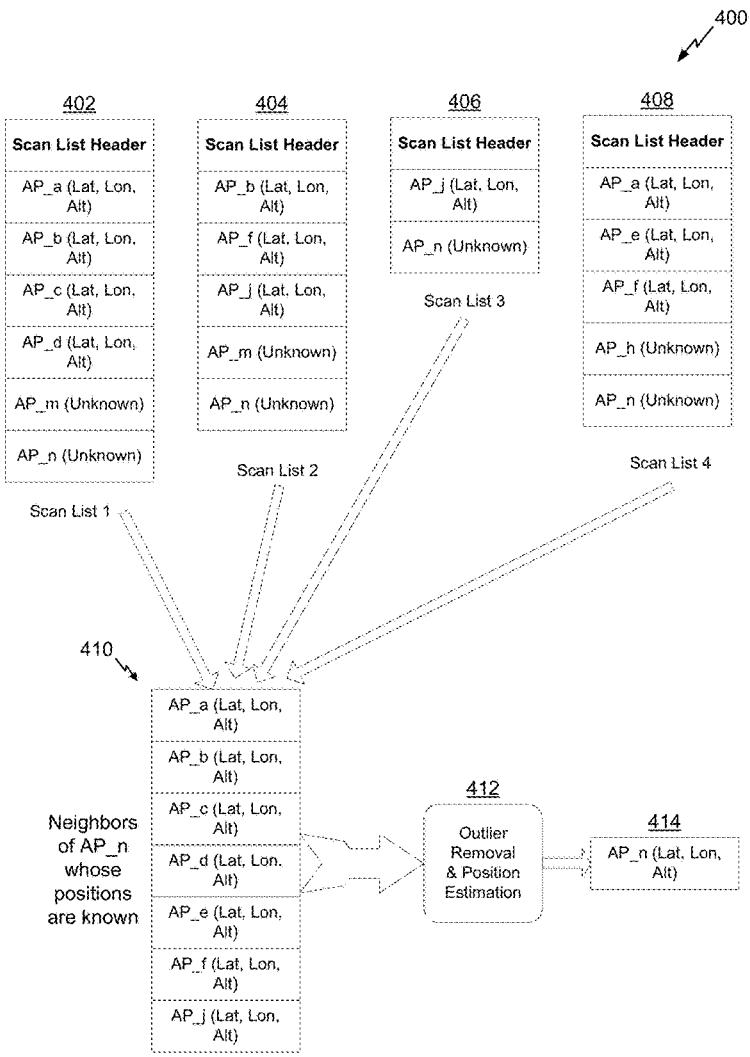
FIG. 4 is a flow diagram of a process of locating a target AP as performed by the system shown in FIG. 3.
Figure 5:
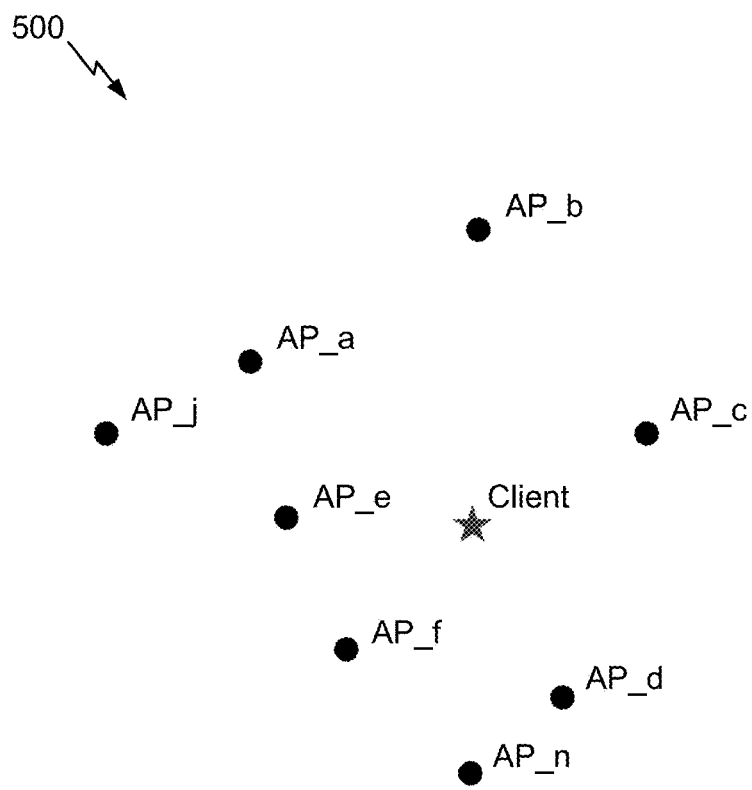
FIG. 5 is two-dimensional plot of example AP and user positions within a wireless communication system.

An example of the processing operations performed by system 300 for a set of scan lists and a target AP AP_n is shown by diagram 400 in FIG. 4. In particular, diagram 400 shows a set of scan lists 402, 404, 406, 408, which are compiled to form a neighbor list 410 of APs corresponding to the target AP AP_n. The neighbor list 410 is processed by an outlier removal and position estimation block 412, from which an estimated position 414 for AP_n is obtained. As used herein, the term non-geotagged access point means an access point that is not associated with any direct position information. A geo-tagged access point is an access point with direct position information, such as determined by a positioning system on a receiver (e.g., GNSS) that is communicating with the access point. The operations shown in diagram 400 are performed for an example network configuration of multiple access points and a client mobile device, as shown by diagram 500 in FIG. 5. While diagram 500 is a two-dimensional plot, data points corresponding to the diagram could also be configured to convey information relating to altitude, and/or any other suitable information.

Regarding operation of the position estimator 328, a simple mean algorithm with outlier detection may be used, e.g., when RSSI (received signal strength indication) values having high uncertainty are received from crowdsourcing data. As another example, more complex weighted mean algorithms based on RSSI may be utilized. Other algorithms, such as a mixed sector algorithm, may also be used. Various examples of algorithms that may be used are described in more detail below.

In some cases, a scan list may be obtained in which no APs 204 are registered in the AP database 202. Such a list is referred to as a pure blind scan list. In this case, positioning mechanisms such as a self-located AP (SLAP) technique can be utilized to determine the relative positions of the APs 204. If absolute locations of a portion of the APs 204 are later obtained, the positions can be propagated to the remainder of the APs 204 using the known AP positions as anchors. To these ends, pure blind scan lists may be saved in separate storage, e.g., at the memory 140, for subsequent processing.

For a non-geotagged scan list in which at least some of the listed APs are registered with the AP database 202, location information may be extracted from the existing scan list. First, APs 204 listed in the scan list are checked against the AP database 202 to determine whether corresponding location information is present or whether any of the APs 204 in the scan list are new (i.e., a fresh AP). If corresponding geotagged location information is present, the AP locations not given in the AP database 202 (e.g., non-geotagged APs) may be determined by reverse positioning using the known geotagged AP positions. For instance, the neighbor list generator 324 may identify a fresh target AP (e.g., a fresh non-geotagged AP) having an unknown position and compile a list of APs 204 in one or more obtained scan lists that are within the maximum scan range of the target AP. Using this information combined with the known position of other APs near the target AP, the position of the target AP is estimated using outlier removal and reverse positioning algorithms, e.g., as performed by the outlier removal module 326 and position estimator 328, respectively. The data aggregation engine 330 may run periodic analysis of the position information within the AP database to determine if position estimates of one or more non-geotagged APs are sufficiently accurate to be published to other location based service applications. Techniques utilized by these modules 326, 328, 330 are described in further detail below.

Figure 6:
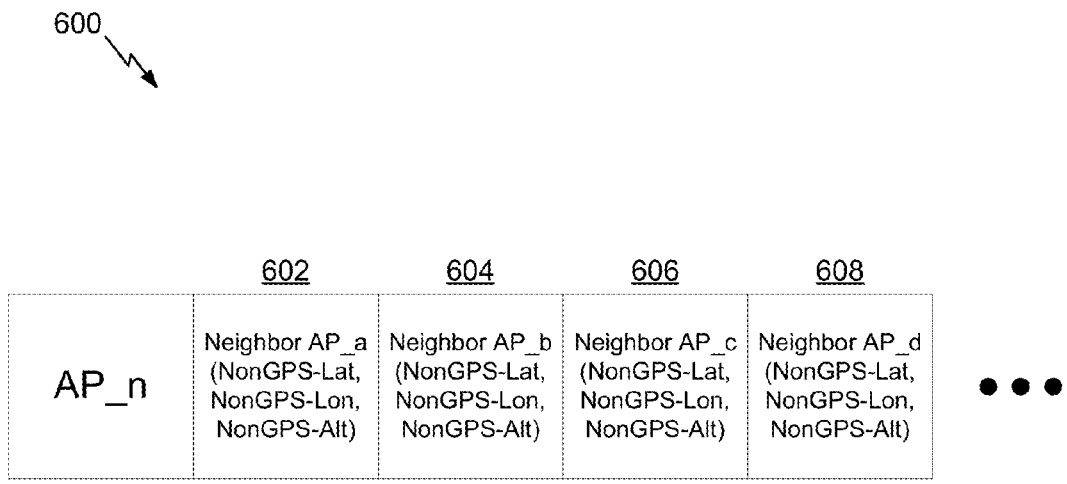
FIGS. 6-7 are diagrams of example data structures utilized for storing AP location information.

To facilitate positioning, crowdsourcing data for various APs can be formatted using the data structure 600 shown in FIG. 6, which includes respective entries 602, 604, 606, 608, . . . , for APs that neighbor an AP corresponding to the data structure 600, here labeled as AP_n. If AP_n is on a scan list that has a geotag, i.e., an indication of a geographical location (corresponding to the location of the AP), then AP_n can be processed as a geotagged crowdsourcing AP. If AP_n is on some non-geotagged scan lists and some of its neighboring APs have position information from the AP database 202, then AP_n may be positioned as if it has been seen at those neighbors' positions. Stated another way, each neighbor's position is treated as a measurement position for that AP. Those positions are then utilized to position AP_n.

Figure 7:
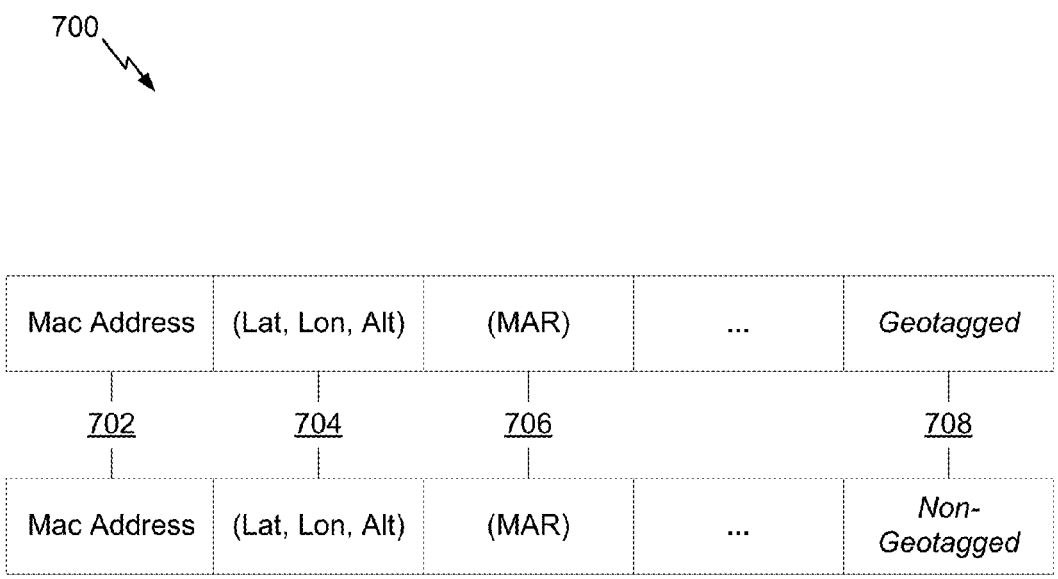

As further shown by data structure 700 in FIG. 7, a flag field 708 may be used in the data structure 700 along with other fields such as a media access control (MAC) address field 702, a latitude/longitude/altitude field 704, a maximum antenna range (MAR) field 706, and/or other fields for each AP. The flag field 708 indicates whether the AP's position is based on geotagged crowdsourcing data or non-geotagged scan lists. This flag may serve as a marking of the estimated location of a target transceiver as non-geotagged in a transceiver database. This flag may be used by the data aggregation engine 330 to perform periodic analysis of the non-geotagged APs to verify the convergence of location calculations for the non-geotagged APs, e.g., to verify the location of a non-geotagged AP prior to publishing the location information to a location based service or other database. As an alternative to data structure 700, each AP may have a field corresponding to a positioning uncertainty (e.g., confidence factor), which may subsequently be used to manage error propagation. Other techniques may be used.

To reduce the storage utilized for the AP database 202, various optimizations may be employed. For instance, each scan list may be assigned a scan list ID (SLID), such that for each AP, the IDs of the scan lists including the AP may be stored instead of records for each of the neighbor APs. For subsequent positioning, the neighbor AP information can be retrieved using the stored SLIDs as a reference.

Assuming the position of at least one AP in respective scan lists is known, the scan lists may be stored based on their geographical area, e.g., as a grid map. Based on this storage scheme, positioning of APs may proceed by navigating through adjacent scan lists, bringing the APs in those scan lists to memory, performing reverse positioning for APs with unknown locations, and then incrementally moving to the next geographic area. In this way, the number of times a scan list and its corresponding AP locations are accessed may be reduced.

Position Estimation Techniques

The position estimator 328 may utilize various techniques (e.g., algorithms) for estimating AP position based on the obtained positions of other APs in the surrounding area. These techniques include simple mean/median of locations/positions, a weighted mean of locations/positions, and max RSSI techniques, although other techniques are possible. The location of a target transceiver can be calculated using at least one of a simple mean of locations, a simple median of locations, a weighted mean of locations, a weighted mean of positions corresponding to k received signals of highest received signal strength, or a least-squares iterated location determined by trilateration using received signal strength indications. In the following algorithms, the difference in altitude between APs is assumed to be negligible, thus enabling altitude to be omitted from the calculations. However, the algorithms described below could be extended to additionally account for altitude by, e.g., expanding the scope of the calculations to a three-dimensional (x, y, z) coordinate system, and/or via other appropriate adjustments.

Simple Mean/Median

With regard to the simple mean/median algorithm, the estimated AP position is a simple mean/median of all positions of the neighbor APs. The simple mean calculation may be expressed as follows:

$$AP_{POS} = \frac{\sum_{i=1}^{NumNbr} (Nbr_{POS_i})}{NumNbr} AP_{POS} = \frac{\sum_{i=1}^{NumNbr} (Nbr_{POS_i})}{NumNbr}$$

where NumNbr is the number of neighbor APs, $AP_{POS}$ is the position of the target AP, and $Nbr_{POS_i}$ is the position of the i-th neighbor AP.

Additionally, the simple median calculation may be expressed as follows:

$$AP_{pos}x = \text{median}(Nbr_{POS}x_1, \ldots, Nbr_{POS}x_i, Nbr_{POS}x_{NumNbr})$$

$$AP_{pos}y = \text{median}(Nbr_{POS}y_1, \ldots, Nbr_{POS}y_i, Nbr_{POS}y_{NumNbr})$$

where $AP_{pos}x$ and $AP_{pos}y$ are the position of the target AP in the x and y directions, respectively, with respect to an (x, y) coordinate system and $Nbr_{POS}xi$ and $Nbr_{POS}yi$ are the position of the i-th neighbor AP in the x and y directions, respectively.

Weighted Mean

With regard to the weighted mean algorithm, the estimated AP position is calculated as a weighted mean of reported mobile station GNSS measurements. The weighted mean calculation may be expressed as follows:

$$AP_{POS} = \frac{\sum_{i=1}^{NumNbr} weight_i (Nbr_{POS_i})}{\sum_{i=1}^{NumNbr} weight_i}$$

The weighting scheme utilized in the above calculation may be computed in various manners. For instance, values assigned to the parameter weight, may include, but are not limited to, the following:

1) 1/(i-th neighbor's position uncertainty (e.g., in meters))
2) $\exp(0.1 \times RSSI_i)$, where $RSSI_i$ is the observed RSSI (received signal strength indication) for the i-th neighbor AP given, e.g., in dBm
3) $\exp(0.1 \times RSSI_i)$/(i-th neighbor's position uncertainty (e.g., in meters))

Max RSSI

With regard to the max RSSI algorithm, k (e.g., 6) neighbors with the highest RSSI readings are selected and averaged using weights $\{w1, w2, \ldots, wk\}$, where $w = 10^{0.1 \; rssi}$ and rssi represents RSSI given in units of mW. The max k calculation may be expressed as follows:

$$AP_{POS} = \frac{\sum_{i=1}^{k} (Nbr_{POS_i})}{\sum_{i=1}^{k} w_i}$$

where $Nbr_{POS_i}$ is the position of the i-th neighbor (e.g., as given by the AP database 202), whose RSSI reading is the i-th largest among the mobile station reports.

Outlier Removal

The outlier removal module 326 may be utilized to pre-process AP lists before positioning via the position estimator 328 based on various factors. For instance, the outlier removal module 326 can be utilized to correct errors in an AP scan list (such as inaccurately reported APs or the like), movement of an AP from a previously reported location to a new location, or other inaccuracies. The outlier removal module 326 may utilize a clustering algorithm to identify clusters of reported APs. From these identified clusters, individual APs whose locations deviate from the cluster by more than a threshold amount can be identified as outliers and removed.

An example algorithm that may be utilized by the outlier removal module 326 is given in pseudocode format below. The following algorithm is merely one example that could be utilized, and other algorithms are possible.

```
IF No single AP for which position is known in the WiFi scan list:
Return Failure;
END
ratioThreshold      = 0.8;
circleRadius        = 1000;
extremeLowWeight = 1/10^9;
APNumLowerLimit = 3;
MSPos__Lat    = LatAvg;
MSPos__Long   = LongAvg;
MSPos__Alt    = AltAvg;
Loop through the APs and find the APs that are within circleRadius from Initial Mean (MSPos),
mark them as FullWeightAPs;
AP__Density__Near__Mean = [(Number of FullWeightAPs)/(NumAPsforPosition)];
IF (NumNonImportantAPs = 0)
{
AP__Density__Near__Mean = 1;
}
ELSE
{
AP__Density__Near__Mean = 0;
}
ENDIF
WHILE ((NumAPs >3) & (AP__Density__Near__Mean <=0.8))
{
Mark the AP that is the farthest from the mean position as "NonImportantAPs"
     NumAPsforPosition--;
(LatAvg, LongAvg) = Weighted Average (FullWeightAPs Latitude, FullWeightAPs Longitude) +
(NonImportantAPs Latitude, NonImportantAPs Longitude) * extremeLowWeight;
Loop through the remaining APs and find the APs that are within circleRadius from Mean,
mark them as FullWeightAPs; Find the APs that are outside circleRadius from Mean, mark
them as NonImportantAPs;
AP__Density__Near__Mean = [(Number of FullWeightAPs)/(NumAPsforPosition)];
}
END WHILE
IF NumAPsforPosition <= APNumLowerLimit
{
```

```
(LatAvg, LongAvg) = Weighted Average (Latitude, Longitiude);
AltAvg = Weighted Average (Altitude);
}
ELSE
{
(LatAvg, LongAvg) = Weighted Average (FullWeightAPs Latitude, FullWeightAPs Longitude) +
(NonImportantAPs Latitude, NonImportantAPs Longitude) * extremeLowWeight;
AltAvg = Weighted Average (FullWeightAPs Altitude) + (NonImportantAPs Altitude) *
extremeLowWeight;
{
ENDIF
MSPos_Lat    = LatAvg;
MSPos_Long   = LongAvg;
MSPos_Alt    = AltAvg;
```

In the above algorithm, the extremeLowWeight parameter is utilized to reduce the weight associated with APs that are not utilized in obtaining the position estimate. Alternatively, these unused APs could be simply removed from the calculations, e.g., by weighing such APs with a weight of 0 and/or by other means.

Non-Geotagged Transceiver Location Convergence

Figure 8A:
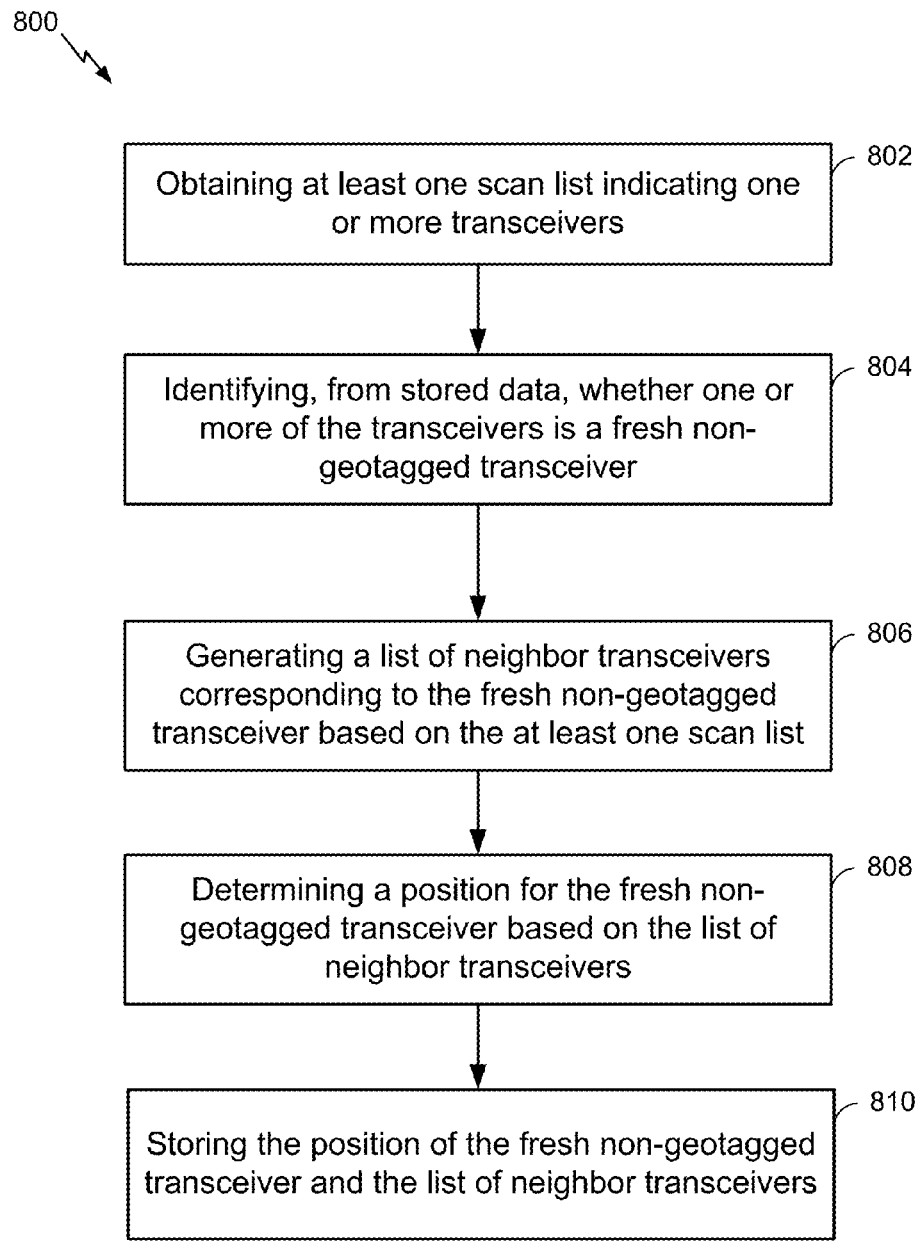
FIG. 8A is a block flow diagram of a process for locating a fresh non-geotagged transceiver in a wireless communication system.

Referring to FIG. 8A, with further reference to FIGS. 1-7, a process 800 for locating a fresh non-geotagged transceiver in a wireless communication system includes the stages shown. The process 800 is, however, an example only and not limiting. The process 800 can be altered, e.g., by having stages added, removed, rearranged, combined, and/or performed concurrently.

At stage 802, the process 800 includes obtaining at least one scan list indicating one or more transceivers. A scan list is an indication of the one or more transceivers, and does not require any particular format. The at least one scan list is obtained by the scan list compiler 322, e.g., from the mobile device 100, and indicates a set of transceivers (e.g., Wi-Fi access points, BLUETOOTH short-range wireless communication technology transceivers, cellular base stations such as femtocells or the like, etc.). One or more of the transceivers in the scan list may be a non-geotagged transceiver.

At stage 804, the process 800 includes identifying, from stored data, whether one or more of the transceivers in the at least one scan list are fresh non-geotagged transceivers. A fresh non-geotagged transceiver is a transceiver which appears on a scan list but does not have a corresponding record in the AP database 202. For example, the system 300 can include a relational database query function as a means to perform a search of the AP database to determine whether any of the transceivers in the at least one scan list are fresh transceivers. As part of the process 800, but not necessarily at stage 804, the relational database can be programmed to append a new record to the AP database 202 for the fresh transceiver, including setting the flag field 708 to indicate that the position of the fresh transceiver is based on a non-geotagged scan list. The at least one scan list may also include other transceivers which were previously located that are distinct from the fresh non-geotagged transceiver. For example, the predetermined locations of at least some of the transceivers represented in the at least one scan list obtained at stage 802 are obtained from stored geotagging data, e.g., data associated with geotagged transceiver records in a transceiver database, e.g., the AP database 202. The geotagging data may be, e.g., GNSS information.

At stage 806, the process 800 includes generating a list of neighbor transceivers corresponding to the fresh non-geotagged transceiver based on the at least one scan list. A list of transceivers that neighbor the target transceiver is generated based on the at least one scan list obtained at stage 802 by the neighbor list generator 324. Here, the term "neighbor" includes adjacent transceivers as well as non-adjacent transceivers that are within a same geographic area, e.g., an area defined by a scan range of a mobile device 100 or one of the transceivers, or any other area suitable for establishing proximity between transceivers. In an example, the system 300 operates on a server with, or as part of, the AP database 202. The neighbor list generator 324 can query the data structure 600 based on the previously known (i.e., not fresh) geotagged transceivers in the at least one scan list. The results of the query can be a list of neighbor transceivers.

At stage 808, the process 800 includes determining a position for the fresh non-geotagged transceiver based on the list of neighbor transceivers. The neighbor list generated at stage 806 is used by the position estimator 328 with the transceiver locations identified at stage 804 to estimate a location of the fresh non-geotagged transceiver. In an embodiment, determining the position of the fresh non-geotagged transceiver may include detecting and removing erroneously listed transceivers. Erroneously listed transceivers (or outliers) are detected and removed from the list of neighbor transceivers generated at stage 806 by the outlier removal module 326. The outlier removal module 326 can detect and remove the erroneously listed transceivers, e.g., by identifying a cluster of transceivers within the list of neighbor transceivers according to locations of the neighbor transceivers and determining a neighbor transceiver, in the list of neighbor transceivers, having a location that deviates from a cluster of transceivers by more than a threshold to be the erroneously-listed transceiver, and removing that transceiver.

At stage 810, the process 800 includes storing the position of the fresh non-geotagged transceiver and the list of neighbor transceivers. The position estimator 328 may be configured to store then position information determined at stage 808 for the fresh non-geotagged transceiver as an estimated position 414 in the AP database 202. The list of neighbor transceivers can be stored in the AP database 202 as a data structure 600 where AP_n is the fresh non-geotagged transceiver.

Figure 8B:
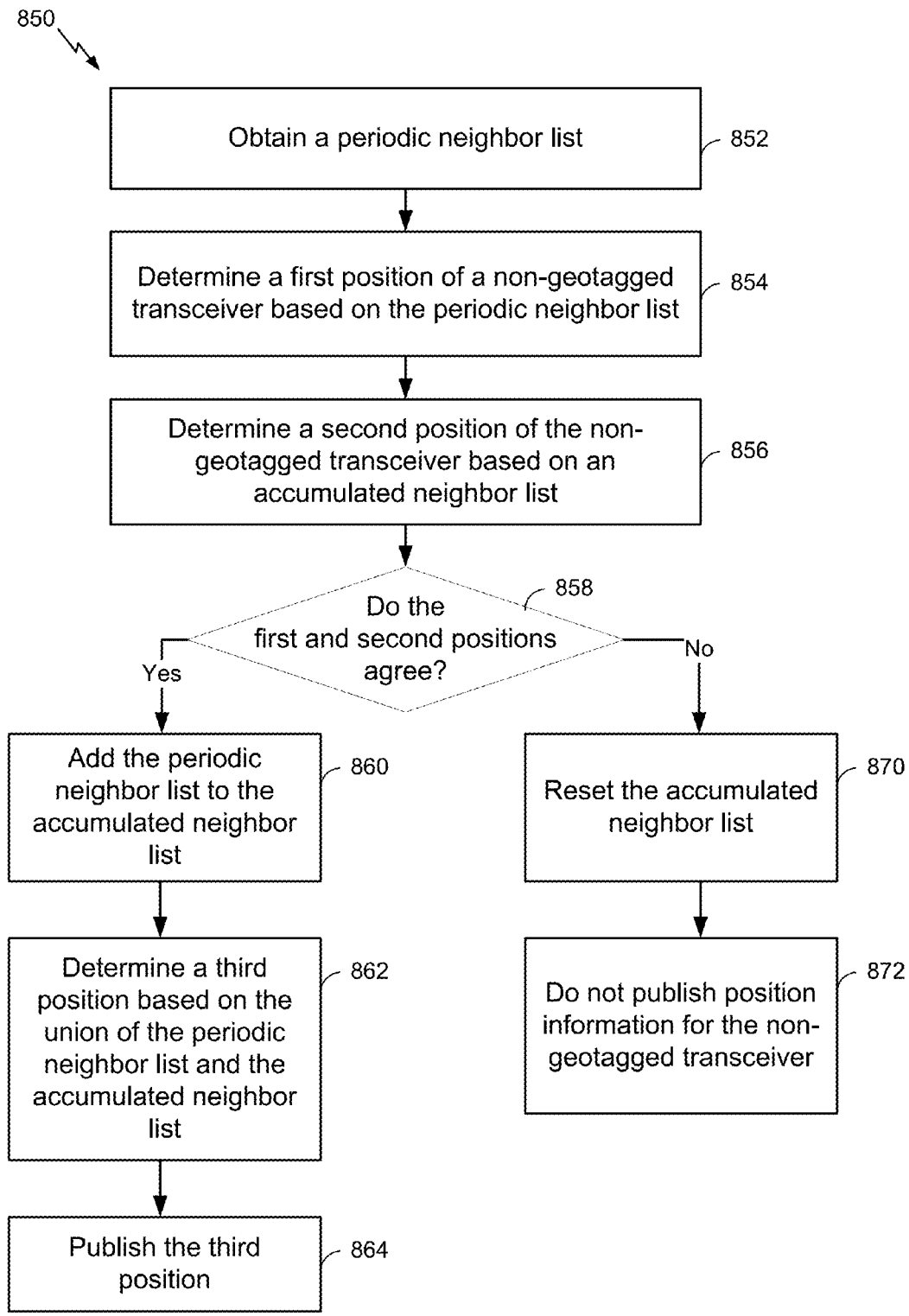
FIG. 8B is a block flow diagram of a process of publishing a location for a non-geotagged transceiver in a wireless communication system.

Referring to FIG. 8B, with further reference to FIGS. 1-8A, a process 850 for publishing a location for a non-geotagged transceiver in a wireless communication system includes the stages shown. The process 850 is, however, an example only and not limiting. The process 850 can be altered, e.g., by having stages added, removed, rearranged, combined, and/or performed concurrently. The data aggregation engine 330 and the position estimator 328 may be a means for executing the process 850.

At stage 852, the data aggregation engine 330 may obtain a periodic neighbor list. The periodic neighbor list is associated with a non-geotagged transceiver such as the neighbor list generated at stage 806 that is retrieved from the AP database 202 on a periodic basis (e.g., hourly, daily, weekly). For example, the data aggregation engine 330 can use a non-geotagged transceiver as a parameter to query the AP database 202 at the end of an upload period (e.g., 1 day) and receive the neighbor list associated with the non-geotagged transceiver. In operation, the data aggregation engine 330 can upload such a periodic neighbor list for each non-geotagged transceivers within some or all of the AP database 202. Each uploaded neighbor list for each non-geotagged transceiver can be individually stored as a temporary neighbor list corresponding to the day (e.g., period) of the upload.

At stage 854, the data aggregation engine 330 may utilize the position estimator 328 to determine a first position for a non-geotagged transceiver based on the periodic transceiver list uploaded at stage 852. The first position can be calculated based on the Position Estimation Techniques previously described, or on other known position estimation methods. The position estimate calculated from the periodic neighbor list can be stored as a temporary position estimation corresponding to the day (e.g., a regular time period) of the periodic neighbor list upload.

Figure 9A:
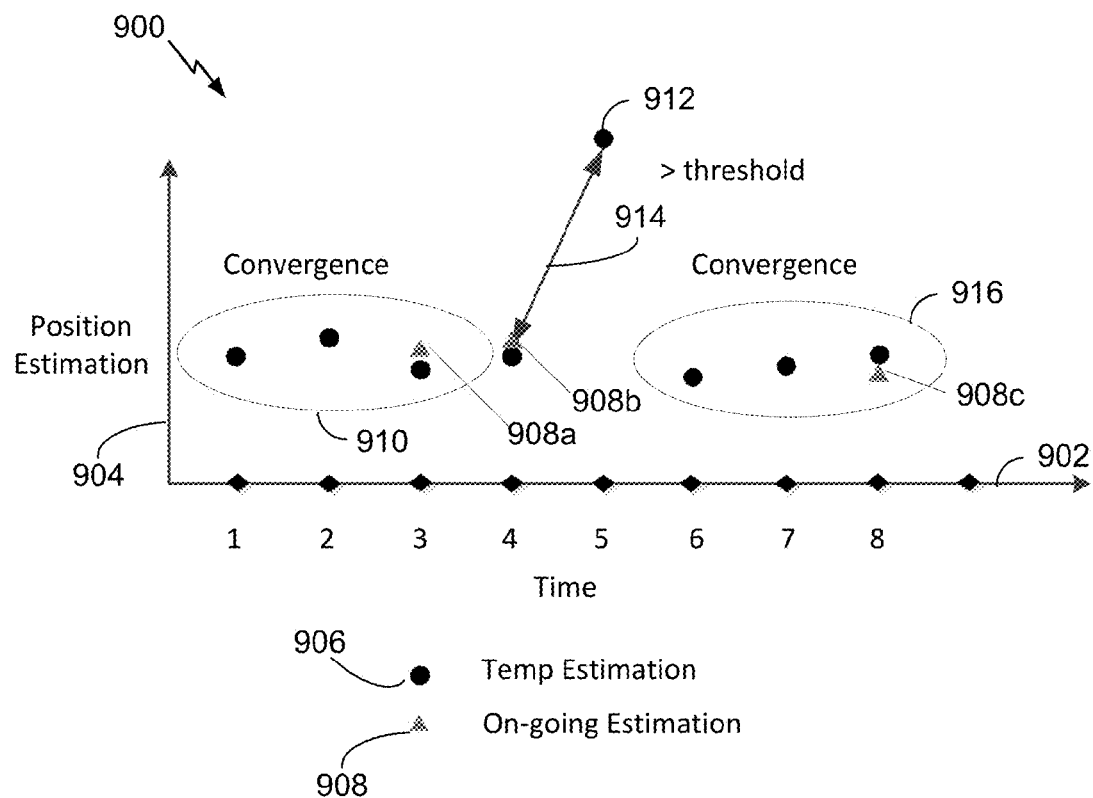
FIGS. 9A-9C are diagrams of position estimation convergence for a non-geotagged transceiver in a wireless communication system.

At stage 856 the data aggregation engine 330 may utilize the position estimator 328 to determine a second position of the non-geotagged transceiver based on an accumulated neighbor list. The second position can be calculated based on the Position Estimation Techniques previously described, or on other known position estimation methods. In operation, the data aggregation engine may determine the position of each non-geotagged transceiver twice for each regular time period (e.g., hourly, daily, weekly). The first position estimate is determined based on the periodic neighbor list at stage 854, and the second position estimate is determined based on the accumulated neighbor list and may be viewed as an on-going position estimation. That is, the accumulated neighbor list is the union of the qualified periodic neighbor lists that are uploaded for a number of consecutive periods inside an observation window. The observation window may be established as programmable system parameter (e.g., 2, 3, 5, 10, periods). Referring to FIG. 9A, an exemplary diagram 900 of position estimation convergence for a non-geotagged transceiver is shown. The exemplary diagram 900 includes a time axes 902 and a position estimation axes 904. As indicated by the legend, the diagram includes a series of temporary position estimates 906, and a series of on-going position estimates 908. The time axes 902 indicates a number of periods (e.g., days) and the position estimation axes 904 indicates a relative position for each temporary and on-going position estimates. The temporary position estimates 906 are the first position determined at stage 854, and the on-going position estimates 908 are determined at stage 862.

Referring back to FIG. 8B, at stage 858 the data aggregation engine 330 determines whether the first and second position estimates agree. The first and second position estimates will agree if they are within a threshold distance of one another. The threshold distance may be a programmable value (i.e., a predetermined threshold value) based on the needs of downstream location services and/or the capabilities of the wireless network (e.g., 1 m, 10 m, 100 m, 500 m), and may be determined by, for example, a Weighted Standard Distance (WSD) calculation applied to the periodic and accumulated neighbor lists. The WSD may be defined as the weighted mean of all the distances of AP positions to the geographic mean.

$$WSD = \sum_{i=1}^{n} w_i d_i \bigg/ \sum_{i=1}^{n} w_i$$

where $w_i = i^{th}$ AP's observation count.

At stage 860, if the first position and the second position agree, the data aggregation engine 330 is configured to add the current periodic neighbor list to the accumulated neighbor list. As a result, the new accumulated neighbor list represents the union of the prior accumulated neighbor list and the current periodic neighbor list.

At stage 862, the data aggregation engine 330 may utilize the position estimator 328 to determine a third position based on the union of the periodic neighbor list and the accumulated neighbor list. That is, as described at stage 860, the position estimator 328 may utilize the previously described Position Estimation Techniques on the new accumulated neighbor list to determine the third position. In operation, the third position is the on-going position estimate and may be determined if the periodic neighbor list and the accumulated neighbor list agree over an observation window. The duration of the observation window may be a single upload period, or multiple upload periods. As an example, and not a limitation, referring to a first convergence zone 910 in FIG. 9A, the observation window is three time periods (e.g., 3 days). As illustrated, the temporary position estimates 906 on days 1, 2 and 3 agree with one another (i.e., demonstrate position convergence). The on-going position estimate 908a (i.e., the third position estimate) is calculated for day 3.

At stage 864, the data aggregation engine 330 may publish the third position. The term publish in the context of position estimates for non-geotagged transceivers means to make the position estimate available for subsequent location based services applications. Such applications may require some degree of confidence in the location of a transceiver and therefor the publication of the position estimate implies that the published location information is reliable. In an embodiment, additional confidence metrics based on the observation window, the threshold distance, number of neighbors, or other database values may be determined.

At stage 870, if the first position and the second position do not agree, the data aggregation engine 330 is configured to reset the accumulated neighbor list. The corresponding observation window may also be reset. The current periodic neighbor list may become the initial accumulated neighbor list. Continuing the example on FIG. 9A, at day 4 the position based on the periodic neighbor list (i.e., the first position) agrees with the accumulated neighbor list as stored after the day 3 upload (i.e., on-going position estimate 908a). As a result, at stage 862 the day 4 periodic neighbor list is added to accumulated neighbor list and an on-going position estimate 908b (e.g., a new estimate) is calculated and stored in the AP database 202. On day 5, as illustrated, the position based on the periodic neighbor list (i.e., the first position, the day 5 temporary position estimate 912) does not agree with the on-going position estimate 908b. Specifically, the distance 914 between the temporary position estimate 912 and the on-going position estimate 908b exceeds an established threshold distance (e.g., >threshold).

At stage 872, the data aggregation engine 330 does not publish position information for the non-geotagged transceiver. Non-publication means that the location information for the non-geotagged transceiver is not available for use by location based services. Previously published location information may be depublished (i.e., depublishing means that previously published location information is not available). A non-geotagged transceiver may continue to be monitored by the AP database 202, but the location information is not provided to external applications. Referring to FIG. 9A, the data aggregation engine 330 determines temporary position estimates on days 6, 7 and 8 based on the corresponding periodic neighbor lists. Since the observation window for this example is 3 days, the position convergence 916 is established by day 8. Throughout the period of day 5-day 8 the position estimates for the non-geotagged transceiver are not published. On day 8, the on-going position estimate 908*c* is determined (i.e., stage 862) and published (i.e., stage 864).

Figure 8C:
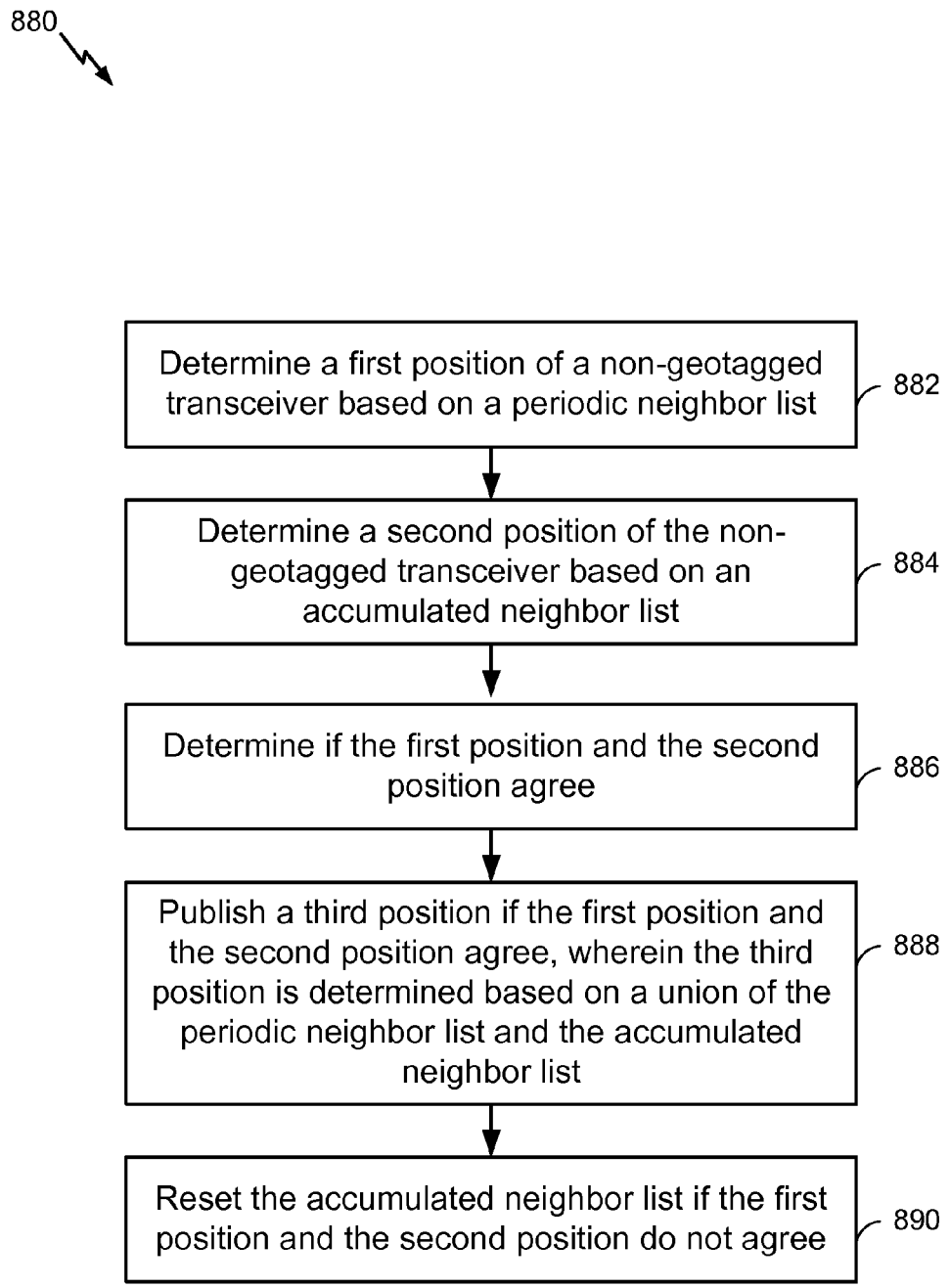
FIG. 8C is a block flow diagram of a process for determining a location for a non-geotagged transceiver in a wireless communication system.

Referring to FIG. 8C, with further reference to FIGS. 1-8B, a process 880 for determining a location for a non-geotagged transceiver in a wireless communication system includes the stages shown. The process 880 is, however, an example only and not limiting. The process 880 can be altered, e.g., by having stages added, removed, rearranged, combined, and/or performed concurrently. The data aggregation engine 330 and the position estimator 328 may be a means for executing the process 880.

At stage 882, the data aggregation engine 330 may determine a first position of a non-geotagged transceiver based on a periodic neighbor list. For example, the position estimator 328 may be used to determine a first position for a non-geotagged transceiver based on a periodic transceiver list upload. The first position may be calculated based on the Position Estimation Techniques previously described, or on other known position estimation methods. The position estimate calculated from the periodic neighbor list may be stored as a temporary position estimation corresponding to the day (e.g., a regular time period) of the periodic neighbor list upload.

At stage 884 the data aggregation engine 330 may utilize the position estimator 328 to determine a second position of the non-geotagged transceiver based on an accumulated neighbor list. The second position may be calculated based on the Position Estimation Techniques previously described, or on other known position estimation methods. In operation, the data aggregation engine may determine the position of each non-geotagged transceiver twice for each regular time period (e.g., hourly, daily, weekly). The first position estimate is determined based on the periodic neighbor list at stage 882, and the second position estimate is determined based on the accumulated neighbor list (e.g., the on-going position estimate as described above).

At stage 886, the data aggregation engine 330 may determine if the first position and the second position agree. The first position and the second position will agree if they are within a threshold distance of one another. The threshold distance may be a programmable value based on the accuracy required and/or capabilities of the wireless network (e.g., 1 m, 10 m, 100 m, 500 m). The programmable threshold distance value may be established to meet the requirements of location services which will utilize the published non-geotagged transceiver position information. The threshold distance may be determined by the Weighted Standard Distance (WSD) described above, but is not so limited as other spatial statistics (e.g., simple mean/median, standard distance, direction distribution, mean center, central feature) may be used.

At stage 888, the data aggregation engine 330 may publish a third position if the first position and the second position agree. The position estimator 328 may determine a third position based on the union of the periodic neighbor list and the accumulated neighbor list. The third position may be an on-going position estimate. In an embodiment, the third position is published if the first position and the second position agree for a consecutive number of time periods defined by an observation window. The duration of the observation window may be a single upload period, or multiple upload periods. The data aggregation engine 330 may be a means to publish the third position.

At stage 890, the data aggregation engine 330 may be configured to reset the accumulated neighbor list if the first position and the second position do not agree. The corresponding observation window may also be reset, and the current periodic neighbor list may become the initial accumulated neighbor list as describe at stage 870.

Figure 9B:
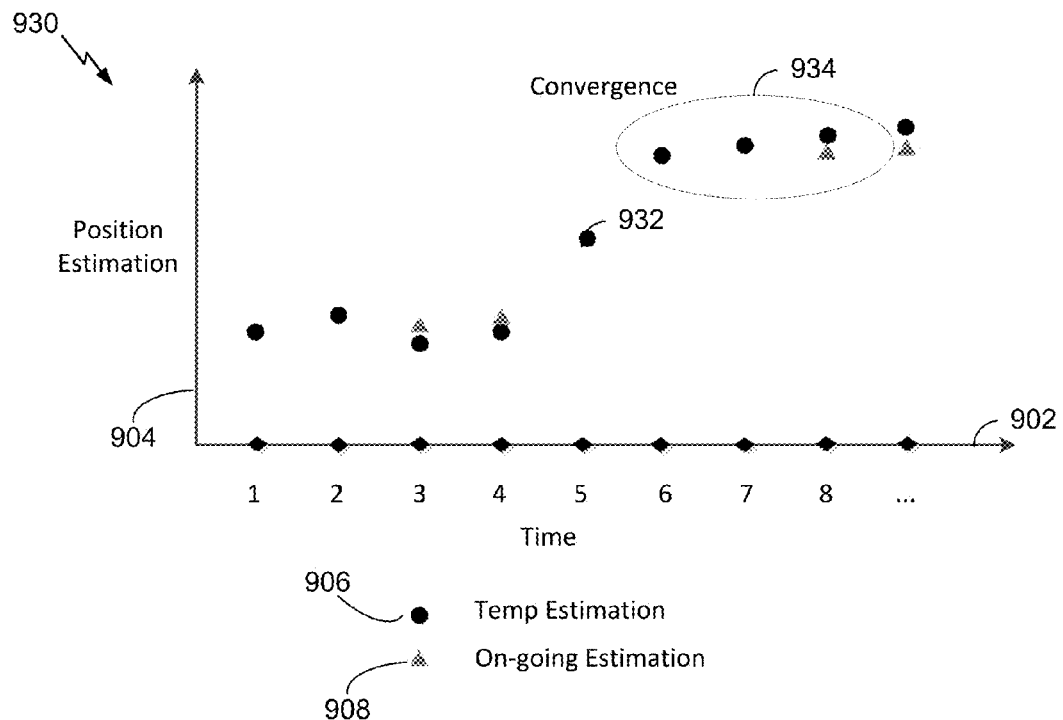
Figure 9C:
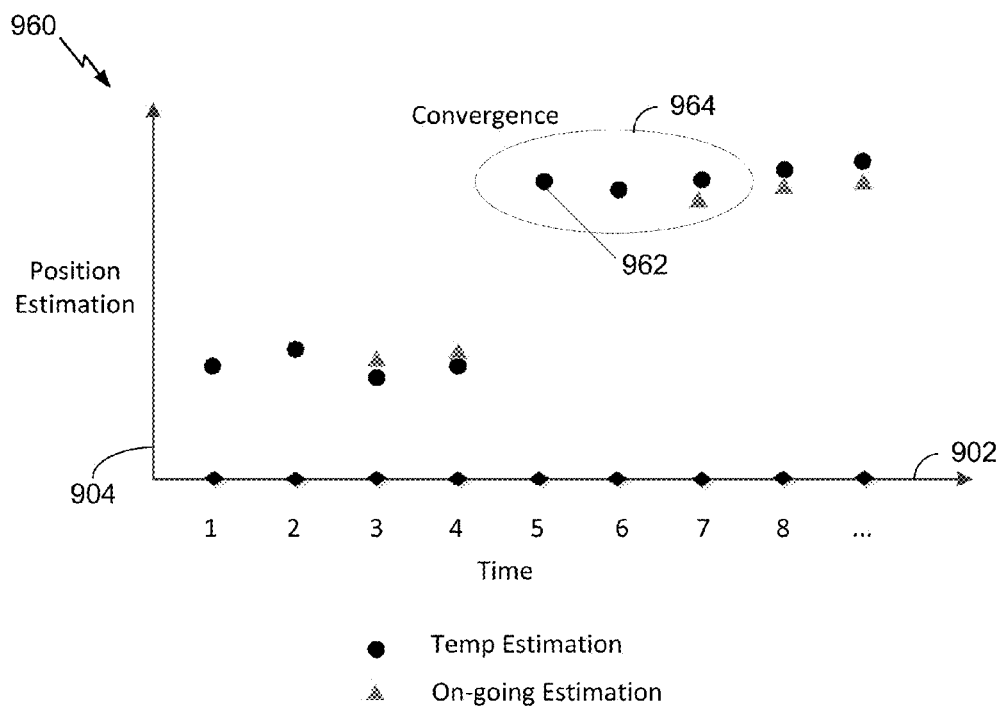

Referring to FIGS. 9B and 9C, additional examples of diagrams of position estimation convergence for a non-geotagged transceiver in a wireless communication system are shown. As discussed with FIG. 9A, each of the additional diagrams 930, 960 includes time axes 902 and a position estimation axes 904. In FIG. 9B, the day 5 temporary position estimate 932 is outside of the distance threshold as compared to the on-going position estimate computed on day 4. The temporary position estimate 932 may be the result of wrong position estimation from the depicted bi-modal neighbor distribution. The data aggregation engine 330 resets the accumulated neighbor list (i.e., stage 870) and does not publish the position of the non-geotagged transceiver (i.e., stage 872). The day 5 temporary position estimate 932 becomes the initial accumulated neighbor list to be used in the day 6 position determinations (i.e., stage 856). The position of the day 6 temporary position estimate also exceeds the distance threshold based on the day 5 temporary position estimate 932 (i.e., the initial accumulated neighbor list). The process 850 repeats at every upload period. Convergence 934 is established by day 8, and the on-going position estimate is published.

In FIG. 9C, the additional diagram 960 demonstrates a theoretical result if a non-geotagged transceiver relocates between the day 4 and the day 5 uploads. As illustrated, the distance between the day 5 temporary position estimate 962 and the on-going position estimate exceeds the distance threshold. As a result, the position information is not published, and the accumulated neighbor list is reset. Convergence 964 is established by day 7 and the on-going position estimate for the non-geotagged transceiver is published.

Figure 10:
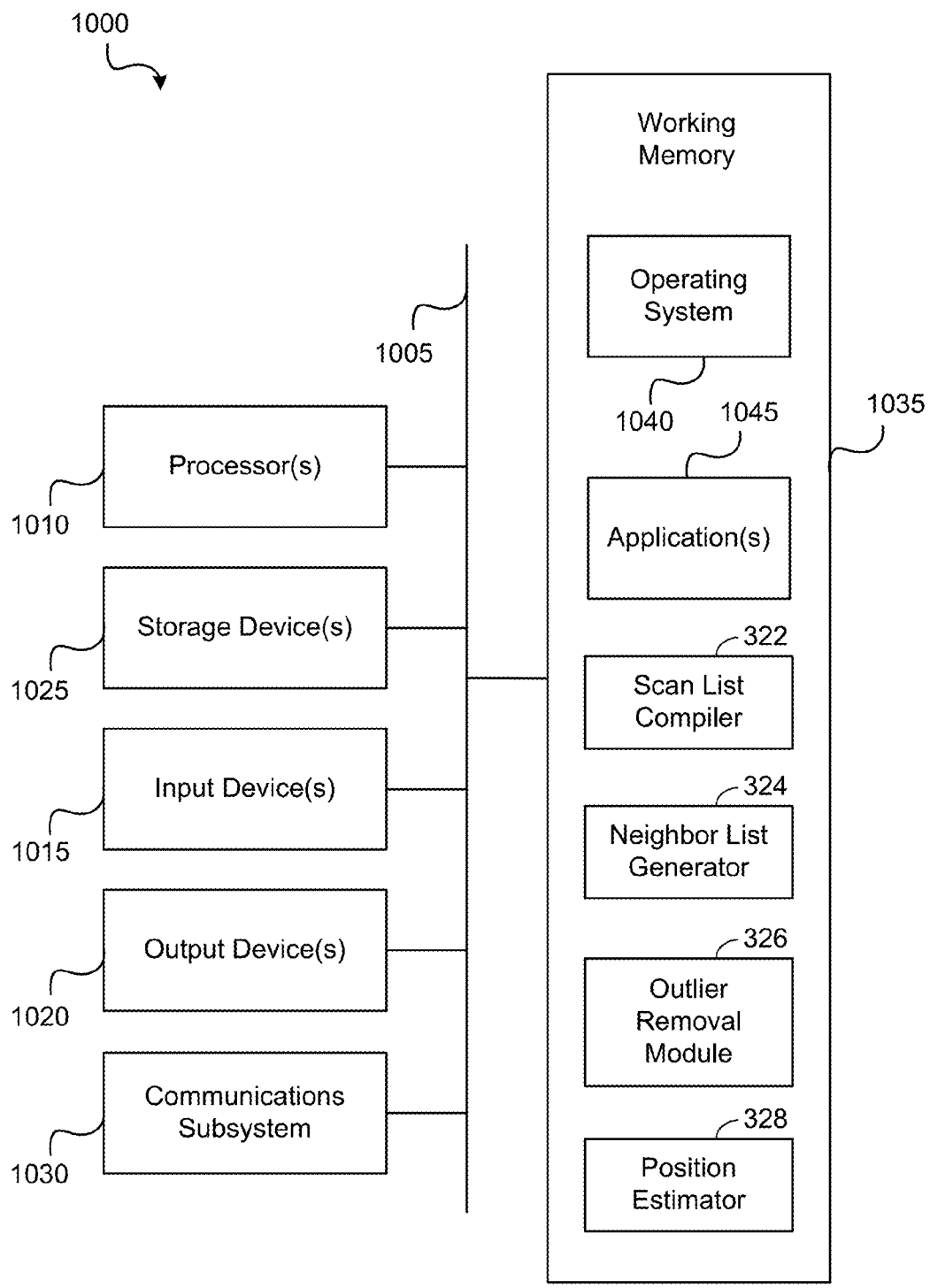
FIG. 10 is a block diagram of an example of a computer system.

A computer system 1000 as illustrated in FIG. 10 may be utilized to at least partially implement the functionality of the previously described computerized devices. FIG. 10 provides a schematic illustration of one embodiment of a computer system 1000 that can perform the methods provided by various other embodiments, as described herein, and/or can function as a mobile device or other computer system. FIG. 10 provides a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like. The processor(s) 1010 can include, for example, intelligent hardware devices, e.g., a central processing unit (CPU) such as those made by Intel® Corporation or AMD®, a microcontroller, an ASIC, etc. Other processor types could also be utilized.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a BLUETOOTH short-range wireless communication technology transceiver/device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise, as here, a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). For instance, as shown in FIG. 10, one or more of the scan list compiler 322, the neighbor list generator 324, the outlier removal module 326, the position estimator 328, the data aggregation engine 330 and/or other functional modules described herein could be implemented via the computer system 1000 via processor-executable software code executed from the working memory 1035 via the processor(s) 1010. Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Other Considerations

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1000) may be used to perform methods in accordance with the disclosure. Some or all of the procedures of such methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for publishing a position of a non-geotagged transceiver in a wireless communication system, wherein the non-geotagged transceiver is not associated with any direct position information, the method comprising:
    receiving one or more scan lists from one or more mobile devices;
    identifying the non-geotagged transceiver from the one or more scan lists;
    generating a periodic neighbor list associated with the non-geotagged transceiver;
    determining a first position of the non-geotagged transceiver based on the periodic neighbor list;
    determining a second position of the non-geotagged transceiver based on an accumulated neighbor list, wherein the accumulated neighbor list is a union between one or more qualified periodic neighbor lists that are generated over a consecutive period of time;
    determining if the first position and the second position agree;
    publishing a third position if the first position and the second position agree, wherein the third position is determined based on a union of the periodic neighbor list and the accumulated neighbor list; and
    resetting the accumulated neighbor list if the first position and the second position do not agree;
    wherein determining each of the first position, the second position, or the third position is based on one or more position estimation techniques, and publishing the third position includes making the third position available for a subsequent location based services application.

2. The method of claim 1 wherein the first position and the second position are determined on a regular time period.

3. The method of claim 2 wherein the regular time period is once a day.

4. The method of claim 2 comprising publishing the third position if the first position and the second position agree for a consecutive number of time periods defined by an observation window.

5. The method of claim 4 wherein the observation window is three time periods.

6. The method of claim 1 wherein the position estimation techniques include one or more of a simple mean/median position estimation technique, a weighted mean position estimation technique, a maximum received signal strength indication estimation technique.

7. The method of claim 1 wherein the first position and the second position agree if a distance between the first position and the second position is less than a predetermined threshold.

8. The method of claim 1 further comprising depublishing a previously published position information for the non-geotagged transceiver if the first position and the second position do not agree, wherein the previously published position information is not available to the subsequent location based services application.

9. An apparatus for publishing a position of a non-geotagged transceiver in a wireless communication system, wherein the non-geotagged transceiver is not associated with any direct position information, the apparatus comprising:

a memory;
a transceiver;
at least one processor operationally coupled to the memory and the transceiver, and configured to:
receive, with the transceiver, one or more scan lists from one or more mobile devices;
identify the non-geotagged transceiver from the one or more scan lists;
generate a periodic neighbor list associated with the non-geotagged transceiver;
determine a first position of the non-geotagged transceiver based on the periodic neighbor list;
determine a second position of the non-geotagged transceiver based on an accumulated neighbor list, wherein the accumulated neighbor list is a union between one or more qualified periodic neighbor lists that are generated over a consecutive period of time;
determine if the first position and the second position agree;
publish a third position if the first position and the second position agree, wherein the third position is determined based on a union of the periodic neighbor list and the accumulated neighbor list; and
reset the accumulated neighbor list if the first position and the second position do not agree;
wherein each of the first position, the second position, or the third position are determined based on one or more position estimation techniques, and the published third position is available for a subsequent location based services application.

10. The apparatus of claim 9 wherein the at least one processor is configured to determine the first position and the second position at a regular time period.

11. The apparatus of claim 10 wherein the regular time period is once a day.

12. The apparatus of claim 10 wherein the at least one processor is configured to publish the third position if the first position and the second position agree for a consecutive number of time periods defined by an observation window.

13. The apparatus of claim 12 wherein the observation window is three time periods.

14. The apparatus of claim 9 wherein the position estimation techniques include one or more of a simple mean/median position estimation technique, a weighted mean position estimation technique, a maximum received signal strength indication estimation technique.

15. The apparatus of claim 9 wherein the at least one processor is configured to determine that the first position and the second position agree if a distance between the first position and the second position is less than a predetermined threshold.

16. The apparatus of claim 9 wherein the at least one processor is further configured to depublish a previously published position information for the non-geotagged transceiver if the first position and the second position do not agree, wherein the previously published position information is not available to the subsequent location based services application.

17. An apparatus for publishing a position of a non-geotagged transceiver in a wireless communication system, wherein the non-geotagged transceiver is not associated with any direct position information, the apparatus comprising:
means for receiving one or more scan lists from one or more mobile devices;
means for identifying the non-geotagged transceiver from the one or more scan lists;
means for generating a periodic neighbor list associated with the non-geotagged transceiver;
means for determining a first position of the non-geotagged transceiver based on the periodic neighbor list;
means for determining a second position of the non-geotagged transceiver based on an accumulated neighbor list, wherein the accumulated neighbor list is a union between one or more qualified periodic neighbor lists that are generated over a consecutive period of time;
means for determining if the first position and the second position agree;
means for publishing a third position if the first position and the second position agree, wherein the third position is determined based on a union of the periodic neighbor list and the accumulated neighbor list; and
means for resetting the accumulated neighbor list if the first position and the second position do not agree;
wherein the means for determining each of the first position, the second position, or the third position includes one or more position estimation techniques, and the means for publishing the third position includes means for making the third position available for a subsequent location based services application.

18. The apparatus of claim 17 wherein the first position and the second position are determined on a regular time period.

19. The apparatus of claim 18 wherein the regular time period is once a day.

20. The apparatus of claim 18 further comprising means for publishing the third position if the first position and the second position agree for a consecutive number of time periods defined by an observation window.

21. The apparatus of claim 20 wherein the observation window is three time periods.

22. The apparatus of claim 17 wherein the position estimation techniques include one or more of a simple mean/median position estimation technique, a weighted mean position estimation technique, a maximum received signal strength indication estimation technique.

23. The apparatus of claim 17 further comprising means for determining a distance between the first position and the second position, and wherein the first position and the second position agree if the distance between the first position and the second position is less than a predetermined threshold.

24. The apparatus of claim 17 further comprising means for depublishing a previously published position information for the non-geotagged transceiver if the first position and the second position do not agree, wherein the previously published position information is not available to the subsequent location based services application.

25. A non-transitory processor-readable storage medium comprising processor-readable instructions for publishing a position of a non-geotagged transceiver in a wireless communication system, wherein the non-geotagged transceiver is not associated with any direct position information, the instructions comprising:
code for receiving one or more scan lists from one or more mobile devices;
code for identifying the non-geotagged transceiver from the one or more scan lists;
code for generating a periodic neighbor list associated with the non-geotagged transceiver;
code for determining a first position of the non-geotagged transceiver based on the periodic neighbor list;
code for determining a second position of the non-geotagged transceiver based on an accumulated neighbor list, wherein the accumulated neighbor list is a union between one or more qualified periodic neighbor lists that are generated over a consecutive period of time;

code for determining if the first position and the second position agree;

code for publishing a third position if the first position and the second position agree, wherein the third position is determined based on a union of the periodic neighbor list and the accumulated neighbor list; and code for resetting the accumulated neighbor list if the first position and the second position do not agree;

wherein the code for determining each of the first position, the second position, or the third position includes instructions based on one or more position estimation techniques, and the code for publishing the third position includes code for making the third position available for a subsequent location based services application.

26. The non-transitory processor-readable storage medium of claim 25 further comprising code for determining the first position and the second position at a regular time period.

27. The non-transitory processor-readable storage medium of claim 26 further comprising code for publishing the third position if the first position and the second position agree for a consecutive number of time periods defined by an observation window.

28. The non-transitory processor-readable storage medium claim 27 wherein the observation window is three time periods.

29. The non-transitory processor-readable storage medium of claim 25 wherein the instructions based on the one or more position estimation techniques include instructions for performing one or more of a simple mean/median position estimation technique, a weighted mean position estimation technique, a maximum received signal strength indication estimation technique.

30. The non-transitory processor-readable storage medium of claim 25 further comprising code for depublishing a previously published position information for the non-geotagged transceiver if the first position and the second position do not agree, wherein the previously published position information is not available to the subsequent location based services application.

* * * * *